2,853,458
WRINKLE DRYING COATING COMPOSITION CONTAINING FISH OIL

Burton E. Lederman, Dayton, Ohio, assignor to Midland Chemical Corporation, Dayton, Ohio, a corporation of Delaware No Drawing. Application January 6, 1954
Serial No. 402,593

1 Claim. (Cl. 260—19)

This invention relates to wrinkle drying varnishes and more particularly to wrinkle varnishes comprising fish oil.

In the preparation of wrinkle drying varnishes and wrinkle vehicles for the preparation of wrinkle drying compositions it has been generally considered necessary to use as the drying oil tung oil, oiticica oil or similar drying oils containing conjugated double bonds or mixtures of these oils. These oils, or mixtures thereof, were generally used either in their raw state or natural state or after treatment as by heating or blowing with air, or both, depending upon the particular characteristics required in the finished wrinkle varnish or vehicle and the nature of the oils being treated.

Although utilization of fish oil in the preparation of wrinkle finishes has been suggested heretofore, it has been found that oleoresinous compositions prepared with fish oils alone do not produce wrinkle drying finishes. It has, however, been discovered that a wrinkle drying composition can be produced utilizing a blend of a fish oil varnish and a tung oil varnish in accordance with this invention. The blend of fish oil and tung oil varnishes, when applied and dried, produces a wrinkle finish having very fine and uniform wrinkles.

This fish oil-tung oil blend also has been found to be superior as a wrinkle finish for the production of low gloss, satin-like wrinkle finishes than where the constituents are mixed together and coacted, as has been the practice heretofore. Blending of the fish oil with tung oil is preferably made by introducing the bodied fish oil as a "checking oil," for example, the cold pre-bodied fish oil is introduced into a batch of hot tung oil which is near its congealing point, to check the reaction so that gelation does not take place and the desired fish-tung oil blend is provided.

It is a principal object of the present invention to produce a wrinkle varnish or base comprising a blend of tung oil varnish and fish oil varnish which produces a fine texture wrinkle finish and which is flexible and tough.

A further object of the invention is to produce an oleoresinous wrinkle drying composition wherein fish oil comprises a principal constituent.

Fish oils are obtained from many different sources, the principal source being menhaden, pilchard and sardine. The sardine oil is characterized by a relatively high iodine number, indicating a comparatively high degree of unsaturation. Such oils having an iodine number of between 180 and 225 are particularly useful in the present invention. The fish oils are preferably heat bodied and blown gently for a few minutes. The fish oil odor is thereby greatly dissipated and the viscosity of the oil substantially increased. This bodied fish oil of relatively high iodine number is utilized in the preparation of the fish oil varnish and wrinkle finish compositions in accordance with this invention.

The wrinkle drying coating compositions of the invention consist of an oleoresinous varnish or enamel wherein fish oil is used together with conjugated double-bond vegetable drying oil, e. g. tung oil and oiticica oil or mixtures thereof, the fish oil constituting about 15 to 35% by weight of the total oil constituent. The fish oil may be used without heat-bodying or air-blowing where the fish odor is not objectionable in the finished product.

Typical examples of formulations and procedures according to this invention are given without intending to limit the same specifically thereto.

Example I

| | Parts by weight |
|---|---|
| Rosin-modified phenol formaldehyde resin | 100 |
| Raw tung oil | 90 |
| Fish oil (heat bodied, Z-4 viscosity) | 30 |
| Xylol | 110 |
| V. M. P. (varnish makers' naphtha) | 110 |

The fish oil-modified tung oil varnish blend may be made by placing the tung oil and resin in a kettle and heating the same to a top temperature of 560° F. Then the mass is cooled to about 540° F. and held until a slight stringing is observed in the drip from a stirring paddle. The kettle is then removed and the fish oil added which checks the polymerization. As soon as the temperature has decreased to about 350° F., the xylol and V. M. P. are stirred into the mixture. The fish oil is preferably sardine oil having an iodine number of at least 180 and which has been heated to 550-600° F., and while thus heated gently aerated for approximately one-half hour. The viscosity of the oil should be about Z-4 (Gardner-Holdt).

To provide a wrinkling varnish, cobalt naphthenate is incorporated in the varnish. The addition of 6% cobalt naphthenate in a ratio of 65 parts by volume of varnish to 1 part of cobalt naphthenate produces a wrinkle drying varnish. Other metallic driers, e. g., manganese borate, cobalt acetate, etc., also may be used or mixtures thereof as desired. Wrinkling is produced upon application of the composition by spraying and flash drying for ten to fifteen minutes, then baking the coating at 300° F. for one-half hour or at 350° F. for fifteen or twenty minutes.

The varnish blend of Example I, upon incorporation of the cobalt naphthenate and applying onto a metal panel and drying at 350° F. for fifteen minutes, yielded a wrinkled film consisting of small, dense wrinkles of uniform size and configuration. The wrinkle finish was less glossy than a like varnish made without fish oil.

Example II

| | Parts by weight |
|---|---|
| Rosin-modified phenol formaldehyde resin | 100 |
| Raw tung oil | 75 |
| Oiticica oil | 20 |
| Fish oil (Exp. I) | 25 |
| Xylol | 110 |
| V. M. P | 110 |

In the above example the varnish was prepared as described in Example I, the pre-heat bodies fish oil being added while cold to the heated tung oil and oiticica-resin mixture.

Upon the incorporation of cobalt drier as in Example I and applying and baking as described, a wrinkle finish was produced having a medium pattern and slightly higher gloss than the varnish of Example I.

A similar varnish blend as in Example II was tried wherein oiticica oil was substituted for tung oil, using 85 parts oil to 35 parts fish oil, yielded only traces of wrinkle over the panel. Increasing the ratio of oiticica oil to fish oil to 90 to 30 respectively gave un-uniform wrinkling and no wrinkling where the coating film was very thin.

Example III

| | Parts by weight |
|---|---|
| Rosin-modified phenol formaldehyde resin | 50 |
| Bis-phenol modified rosin formaldehyde ester | 50 |
| Raw tung oil | 70 |
| Oiticica oil | 30 |
| Fish oil (Exp. I) | 20 |
| Xylol | 110 |
| V. M. P. naphtha | 110 |

In the above example, the tung oil, oiticica oil and resin mixture were heated together as described in Example I and the fish oil incorporated, then finally the thinners. The addition of the same proportionate amount of cobalt naphthenate as in Example I and applying and baking as described yielded a wrinkle finish having a medium pattern and low gloss.

Example IV

| | Parts by weight |
|---|---|
| Rosin-modified phenol aldehyde resin | 50 |
| Bis-phenol modified rosin ester | 50 |
| Raw tung oil | 50 |
| Oiticica oil | 50 |
| Fish oil (Exp. I) | 20 |
| Xylol | 110 |
| V. M. P. naphtha | 110 |

The blending of the varnish ingredients was made as described in Example III.

Upon incorporating cobalt drier as in the foregoing examples and applying and baking the composition, a dense, uniform, raised wrinkle pattern was produced. The wrinkle film exhibited a medium gloss finished similar to that of Example II.

In the foregoing examples, by varying the proportionate amounts of the ingredients, especially by mixing the oils in different proportions, various wrinkle texture patterns may be produced.

Further, pigments may be ground into the oils to obtain the colors desired. Other resins, natural or synthetic, also may be employed for all of the resins included in the examples.

Although, as heretofore mentioned, it has been suggested that fish oils could be used in wrinkle coating compositions, it was unexpected that such relatively high proportionate amounts of fish oil with respect to tung oil could be used without adversely affecting the wrinkle texture. Furthermore, it has been found that where the fish oil is added as a blend or checking oil rather than by co-heating and co-reaction with the other oil and resin constituents that markedly superior results are obtained. It is further unexpected that the utilization of fish oils of the type described, which exhibit no wrinkling power by themselves could be blended with tung oil to produce wrinkle drying coating compositions in accordance with this invention. Even employing fish oils having an iodine value above 190 in oleoresinous varnishes failed to produce a wrinkle upon application and baking, as described in the foregoing examples.

The coating compositions of this invention may be used for application to all kinds of materials such as metal, wood, fabric or the like. Further, the addition of various wrinkle texture modifiers may be employed, and such as disclosed in the U. S. patent, No. 2,275,239.

It will be understood that the foregoing examples are illustrative of the application of the composition and the method of producing wrinkle finishes in accordance with this invention. Moreover, it is not intended to have the present invention limited to or circumscribed by the particular details of procedure, materials or exact procedure described in view of the fact that the present invention is susceptible to modifications as to the constituents and proportionate amounts used, depending upon the desired wrinkle finish texture without departing from the spirit and scope of this invention as set forth in the appending claim.

I claim:

A new wrinkle drying coating composition made up of the following:

| | Parts by weight |
|---|---|
| Rosin-modified phenol formaldehyde resin | 100 |
| Raw tung oil | 75 |
| Oiticica oil | 25 |
| Air blown heat bodied fish oil having an iodine number between 180 and 225 | 25 |
| Xylol | 110 |
| Varnish makers' naphtha | 110 |

Drier cobalt naphthenate 6% added in ratio 65 parts by vol. varnish to 1 part cobalt naphthenate.

References Cited in the file of this patent

UNITED STATES PATENTS

| 2,394,499 | Waldie | Feb. 5, 1946 |
| 2,437,369 | Waldie | Mar. 9, 1948 |

FOREIGN PATENTS

| 547,321 | Great Britain | Aug. 24, 1942 |